(12) United States Patent
Marum et al.

(10) Patent No.: US 10,311,607 B2
(45) Date of Patent: Jun. 4, 2019

(54) CHART DECOMPOSITION AND SEQUENCING FOR LIMITED DISPLAY DEVICES

(71) Applicant: SugarCRM Inc., Cupertino, CA (US)

(72) Inventors: Matthew Marum, Cary, NC (US); Henry Rogers, Raleigh, NC (US)

(73) Assignee: SUGARCRM INC., Cupertino, CA (US)

( * ) Notice: Subject to any disclaimer, the term of this patent is extended or adjusted under 35 U.S.C. 154(b) by 312 days.

(21) Appl. No.: 14/256,822

(22) Filed: Apr. 18, 2014

(65) Prior Publication Data

US 2015/0302619 A1    Oct. 22, 2015

(51) Int. Cl.
*G06T 11/20* (2006.01)
*G06F 17/30* (2006.01)

(52) U.S. Cl.
CPC .................... *G06T 11/206* (2013.01)

(58) Field of Classification Search
CPC ............. G06F 3/0481; G06F 17/241; G06F 17/30056; G06T 11/205; G06T 13/40; G06T 11/206; G06T 13/00; G06Q 30/06
USPC .............. 345/473, 440, 440.2; 715/730
See application file for complete search history.

(56) References Cited

U.S. PATENT DOCUMENTS

| 2005/0231512 | A1* | 10/2005 | Niles et al. | 345/473 |
| 2009/0189920 | A1  | 7/2009  | Chiu et al.  |         |
| 2011/0078560 | A1* | 3/2011  | Weeldreyer et al. | 715/730 |
| 2012/0313957 | A1* | 12/2012 | Fisher et al. | 345/440.2 |

OTHER PUBLICATIONS

Microsoft Powerpoint, Jan. 29, 2013, http://fr.wikipedia.org/wiki/MicrosoftPowerpoint.

* cited by examiner

*Primary Examiner* — Chante Harrison
(74) *Attorney, Agent, or Firm* — Steven M. Greenberg, Esq.; Shutts & Bowen LLP

(57) ABSTRACT

Embodiments of the present invention provide a method, system and computer program product for chart decomposition and sequencing in a limited display device. In an embodiment of the invention, a method of chart decomposition and sequencing in a limited display device is provided. The method includes generating a data visualization for raw data and partitioning the data visualization into a set of a discrete number of segments. The method also includes establishing a sequence for the segments in the set. Finally, the method includes displaying the segments sequentially in frames of an animation according to the sequence in a display of the limited display device.

20 Claims, 2 Drawing Sheets

CHART DECOMPOSITION AND SEQUENCING FOR LIMITED DISPLAY DEVICES

BACKGROUND OF THE INVENTION

Field of the Invention

The present invention relates to graphics rendering in a limited display device and more particularly to chart rendering in a limited display device.

Description of the Related Art

The processing power of the personal computer has proven essential in processing chunks of data to provide fast data reduction not previously possible with the unaided human mind. Essential to data reduction is the visualization of the data reduction. As an essential form of data visualization, charts are often used to ease understanding of large quantities of data and the relationships between parts of the data. Charts can usually be read more quickly than the raw data from which they are produced. Certain types of charts are more useful for presenting a given data set than others. For example, data that presents percentages in different groups or classifications are often displayed in a "pie chart" or a "bar chart". A pie chart is a circular chart divided into sectors, illustrating numerical proportion. In comparison, a bar chart or bar graph is a chart with rectangular bars with lengths proportional to the values that they represent. Conversely, data that represents numbers that change over a period of time are best shown as a line chart. A line chart or line graph is a type of chart which displays information as a series of data points called 'markers' connected by straight line segments.

Displaying data visualizations in a desktop display for a personal computer is of no consequence and modern desktop displays are so large in size, that multiple concurrent displays of different data visualizations in the desktop display can be common. However, with the recent ubiquity of the smart phone and tablet computing, display space has become limited. Therefore, displaying data visualizations within the limited display space of a pervasive device can be quite limited. To wit, many smart phone end users are often compelled to engage in irritating horizontal and vertical scrolling in order to view a complete chart.

To account for the display of a data visualization like a chart or graph in a limited display device, many devices provide for the automated reduction in size of the chart so as to fit the full display of the chart or graph within the confines of the limited display. However, in doing so, detail becomes obscured so that the end user is forced to perform a "zoom" operation to view the very specific details of the data visualization. Yet, the details of the data visualization may be important to understanding the underlying raw data, notwithstanding the general inconvenience of viewing anything in the tiny display area of a conventional display device.

BRIEF SUMMARY OF THE INVENTION

Embodiments of the present invention address deficiencies of the art in respect to data visualization display in a limited display device and provide a novel and non-obvious method, system and computer program product for chart decomposition and sequencing in a limited display device. In an embodiment of the invention, a method of chart decomposition and sequencing in a limited display device is provided. The method includes generating a data visualization for raw data and partitioning the data visualization into a set of a discrete number of segments. The method also includes establishing a sequence for the segments in the set. Finally, the method includes displaying the segments sequentially according to the sequence in a display of the limited display device.

In one aspect of the embodiment, the sequential display of the segments occurs as a slide show. In this regard, each slide of the slide show includes a different one of the segments, a transition between each slide occurring at after a pre-specified time delay. In another aspect of the embodiment, the sequential display of the segments occurs as a slide show, a transition between each slide occurring manually responsive to user input at the limited display device.

In another embodiment of the invention, a limited display data processing system is configured for chart decomposition and sequencing in a limited display device. The system includes a host computer that has memory and at least one processor. The system also includes a chart decomposition and sequencing module executing in the memory of the host computer. The module in turn includes program code enabled upon execution in the memory to generate a data visualization for raw data, to partition the data visualization into a set of a discrete number of segments, to establish a sequence for the segments in the set, and to display the segments sequentially according to the sequence in a limited display.

Of note, the limited display can be part of the host computer. Alternatively, the limited display can be part of a limited display device communicatively coupled to the host computer over a computer communications network. In either case, the data visualization can be a pie chart with each segment being a different classification of data visualized in the pie chart. Or, the data visualization can be a bar chart with each segment being a different bar of the bar chart. Or, the data visualization can be a line graph with each segment being a different portion along an x-axis of the line graph bounded by specific data points in the line graph.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for chart decomposition and sequencing in a limited display device. In accordance with an embodiment of the invention, a data visualization can be generated for a data set of data in a limited display device. The data visualization can include charts or graphs for example. Thereafter, the data visualization can be partitioned into a set of discrete number of segments and ordered into a sequence. Once partitioned and sequenced, each segment in the set can be presented in order of the sequence in a display of the limited display device. In this regard, the set of segments can be displayed automatically as an animation of different frames in sequence, each frame containing one of the segments. An example of an animation is a slide show with each slide including an individual one of the segments, with a pre-set delay between slide transitions. Alternatively, the set of segments can be displayed manually, each frame including an individual one of the segments, each transition between the frames occurring responsive to user input in the limited display device. In this way, the data visualization can be viewed in the limited display device with as much detail as would have been the case in a large display of a desktop computer.

Figure 1:
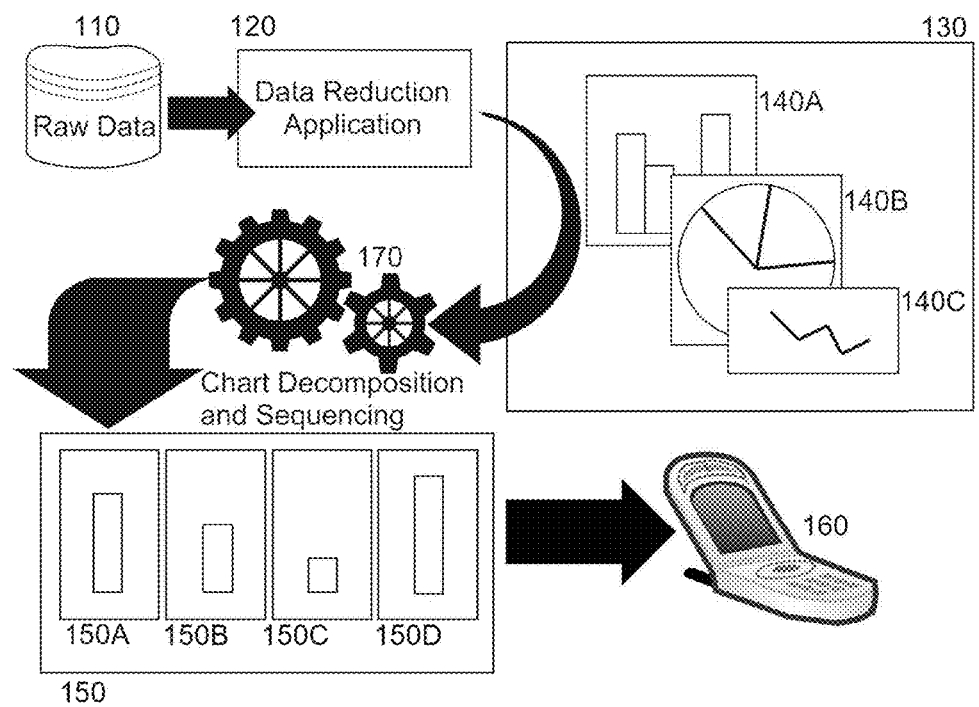
FIG. 1 is a pictorial illustration of a process for chart decomposition and sequencing in a limited display device.

In further illustration, FIG. 1 pictorially shows a process for chart decomposition and sequencing in a limited display device. As shown in FIG. 1, a data reduction application 120 can reduce raw data 110 into a data visualization 130—a bar chart 140A, a pie chart 140B, or a line graph 140C, for example. Chart decomposition and sequencing logic 170 in turn can process the data visualization 130 to identify different segments 150A, 150B, 150C, 150D. The segments 150A, 150B, 150C, 150D can be selected as segments 150A, 150B, 150C, 150D of data of a common characterization as in the case of a pie chart or bar chart, or data of a line segment bound by two different data end points of the raw data 110 as in the case of a line graph. Thereafter, the segments 150A, 150B, 150C, 150D can be sequenced into a set of frames 150 of an animation, for instance a slide show of different slides, each corresponding to a different one of the segments 150A, 150B, 150C, 150D and with pre-determined transitions between the frames. Finally, the set of frames 150 of the animation can be provided to a computing device 160 such as a mobile device for display in sequence in a limited display of the device 160.

Figure 2:
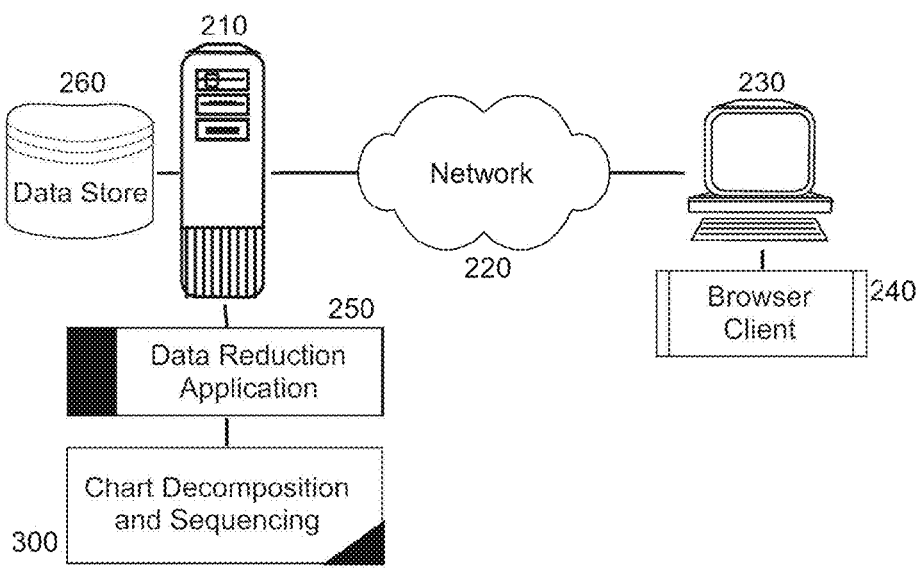
FIG. 2 is a schematic illustration of a limited display data processing system configured for chart decomposition and sequencing in a limited display device; and, FIG. 3 is a flow chart illustrating a process for chart decomposition and sequencing in a limited display device.

The process described in connection with FIG. 1 can be implemented within a limited display data processing system. In yet further illustration, FIG. 2 schematically shows a limited display data processing system configured for chart decomposition and sequencing. The system can include a host computing system 210 that can include one or more computers each with memory and at least one processor. The host computing system 210 can support the execution of a data reduction application 250 programmed to reduce raw data in a coupled data store 260 to different data visualizations. The data visualizations produced by the data reduction application 250 thereafter can be accessed through a browser client 240 in a client computing device 230 from over a computer communications network 220.

Of note, a chart decomposition and sequencing module 300 can be coupled to the data reduction application 250. The chart decomposition and sequencing module 300 can include program code that is enabled upon execution in the memory of the host computing system 210 to segment a chart or graph produced as part of a data visualization by the data reduction application 250 into different segments. The program code further can be enabled to include each of the segments in a different frame and to sequence the frames for presentation in the browser client 240 as an animation, for instance a slide show. Finally, the program code can be enabled to define automated transitions between each frame in the animation during playback of the animation in the browser client 240.

Figure 3:
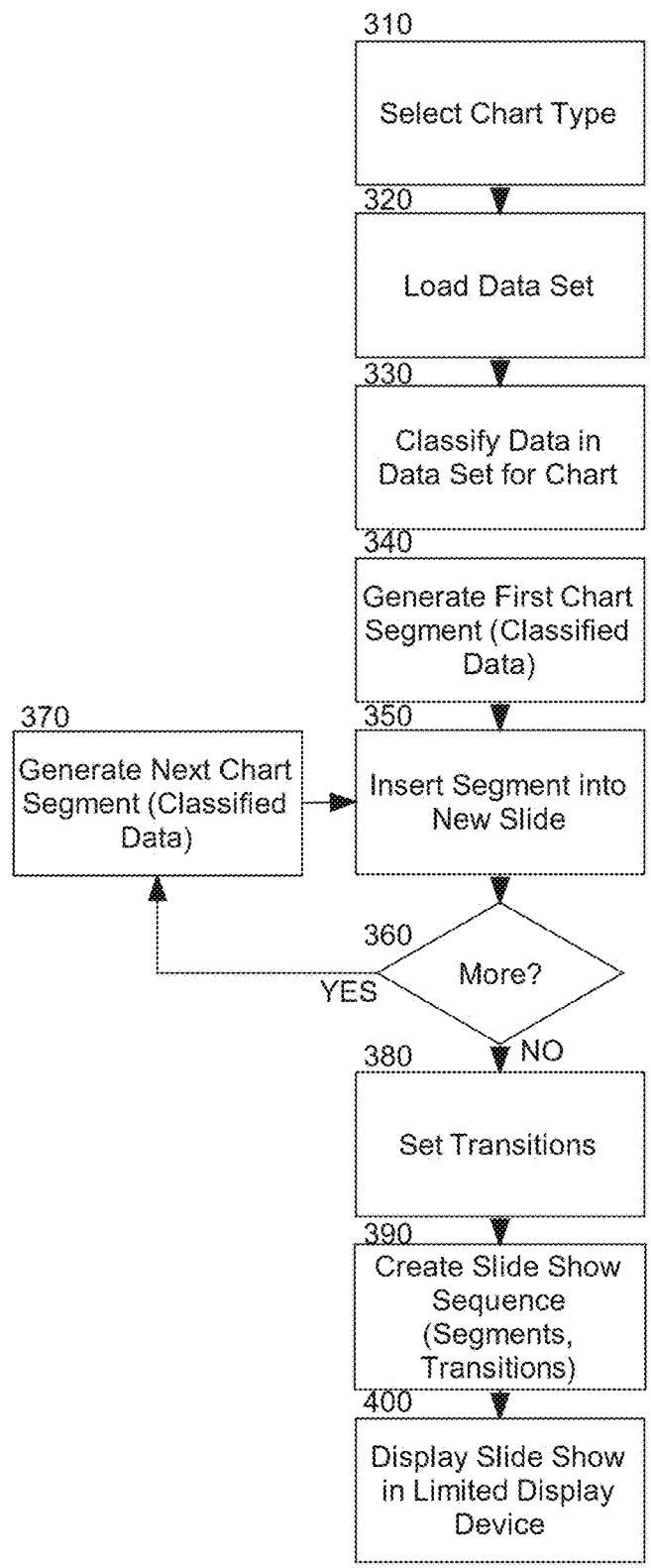

In even yet further illustration of the operation of the chart decomposition and sequencing module, FIG. 3 is a flow chart illustrating a process for chart decomposition and sequencing in a limited display device. Beginning in block 310, a chart type can be selected for visualizing data in a data set. In block 320, the data set can be loaded and in block 330, the data can be classified, for example by type, by range of values, or by frequency of occurrence, to name only three examples. Thereafter, in block 340, a segment of the selected chart can be generated for the data set according to a first classification of the data. In block 350, the generated segment can be inserted into a frame of an animation.

In decision block 360, it can be determined whether or not additional classifications remain from which corresponding segments of the chart can be generated. If so, in block 370 a next segment of the selected chart can be generated for the data set according to a next classification of the data. Again, in block 350, the generated segment can be inserted into a frame of the animation. In decision block 360, when no additional classifications remain from which corresponding segments of the chart can be generated, in block 380 the transitions between each frame can be established and in block 390, an animation can be created with the frames in sequence and transitions disposed therebetween. Finally, in block 400 the animation can be displayed in the device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of automatic chart decomposition and sequencing in a host computing system for display by a limited display device, the method comprising:
   generating by the host computing system, a data visualization for raw data;
   automatically partitioning the entire data visualization into a set of a discrete number of different segments as different images which when combined form the entire data visualization each of the segments being different than each other of the segments;

establishing a sequence for the different images of the different segments in the set; and, displaying each of the different images of the different segments sequentially in correspondingly different frames of a single animation according to the sequence in a display of the limited display device in order to display the entire data visualization.

2. The method of claim 1, wherein the sequential display of the segments occurs as a slide show, each slide of the slide show comprising a different one of the segments, a transition between each slide occurring at after a pre-specified time delay.

3. The method of claim 1, wherein the sequential display of the segments occurs as a slide show, each slide of the slide show comprising a different one of the segments, a transition between each slide occurring manually responsive to user input at the limited display device.

4. The method of claim 1, wherein the data visualization is a pie chart and each segment is a different classification of data visualized in the pie chart.

5. The method of claim 1, wherein the data visualization is a bar chart and each segment is a different bar of the bar chart.

6. The method of claim 1, wherein the data visualization is a line graph and each segment is a different portion along an x-axis of the line graph bounded by specific data points in the line graph.

7. A limited display data processing system configured for automatic chart decomposition and sequencing in a host computing system for display by a limited display device, the limited display data processing system comprising:

a host computer comprising memory and at least one processor; and, an automatic chart decomposition and sequencing module executing in the memory of the host computer, the module comprising program code enabled upon execution in the memory to generate a data visualization for raw data, to automatically partition the entire data visualization into a set of a discrete number of different segments as different images which when combined form the entire data visualization each of the segments being different than each other of the segments, to establish a sequence for the different images of the different segments in the set, and to display each of the different images of the different segments sequentially in correspondingly different frames of a single animation according to the sequence in a display of the limited display device in order to display the entire data visualization.

8. The system of claim 7, wherein the limited display is part of the host computer.

9. The system of claim 7, wherein the limited display is part of a limited display device communicatively coupled to the host computer over a computer communications network.

10. The system of claim 7, wherein the sequential display of the segments occurs as a slide show, each slide of the slide show comprising a different one of the segments, a transition between each slide occurring at after a pre-specified time delay.

11. The system of claim 7, wherein the sequential display of the segments occurs as a slide show, each slide of the slide show comprising a different one of the segments, a transition between each slide occurring manually responsive to user input at the limited display device.

12. The system of claim 7, wherein the data visualization is a pie chart and each segment is a different classification of data visualized in the pie chart.

13. The system of claim 7, wherein the data visualization is a bar chart and each segment is a different bar of the bar chart.

14. The system of claim 7, wherein the data visualization is a line graph and each segment is a different portion along an x-axis of the line graph bounded by specific data points in the line graph.

15. A computer program product for automatic chart decomposition and sequencing in a host computing system for display by a limited display device, the computer program product comprising a computer readable storage medium having program instructions embodied therewith, the program instructions executable by the host computing system to cause the host computing system to perform a method comprising:

generating by the host computing system, a data visualization for raw data;

automatically partitioning the entire data visualization into a set of a discrete number of different segments as different images which when combined form the entire data visualization each of the segments being different than each other of the segments;

establishing a sequence for the different images of the different segments in the set; and, displaying each of the different images of the different segments sequentially in correspondingly different frames of a single animation according to the sequence in a display of the limited display device in order to display the entire data visualization.

16. The computer program product of claim 15, wherein the sequential display of the segments occurs as a slide show, each slide of the slide show comprising a different one of the segments, a transition between each slide occurring at after a pre-specified time delay.

17. The computer program product of claim 15, wherein the sequential display of the segments occurs as a slide show, each slide of the slide show comprising a different one of the segments, a transition between each slide occurring manually responsive to user input at the limited display device.

18. The computer program product of claim 15, wherein the data visualization is a pie chart and each segment is a different classification of data visualized in the pie chart.

19. The computer program product of claim 15, wherein the data visualization is a bar chart and each segment is a different bar of the bar chart.

20. The computer program product of claim 15, wherein the data visualization is a line graph and each segment is a different portion along an x-axis of the line graph bounded by specific data points in the line graph.

* * * * *